US00RE36708E

United States Patent [19]

Mobley

[11] E Patent Number: Re. 36,708

[45] **Reissued Date of Patent: *May 23, 2000**

[54] SIGNAL TO NOISE RATIO ENHANCEMENT USING BASEBAND SIGNALS IN AN FM TELEVISION SYSTEM

[75] Inventor: Joseph G. Mobley, Dunwoody, Ga.

[73] Assignee: Scientific-Atlanta, Inc., Norcross, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/498,253

[22] Filed: Jun. 29, 1995

Related U.S. Patent Documents

Reissue of:

[64] Patent No.: 4,584,599
Issued: Apr. 22, 1986
Appl. No.: 06/683,680
Filed: Dec. 19, 1984

U.S. Applications:

[63] Continuation of application No. 07/957,076, Oct. 6, 1992, abandoned, which is a continuation of application No. 07/541,787, Jun. 21, 1990, abandoned.

[51] Int. Cl.[7] ..... H04N 5/44

[52] U.S. Cl. ..... 348/728; 348/624; 329/319

[58] Field of Search ..... 348/607, 728, 348/470, 624, 727; 358/36, 37, 38, 160, 166, 167, 21 R; 329/315, 318, 319, 320; 455/42, 176.1, 177.1, 200.1, 266; H04N 9/64, 5/44, 9/66

[56] References Cited

U.S. PATENT DOCUMENTS

| | | | |
|---|---|---|---|
| 3,938,181 | 2/1976 | Avins | 358/38 |
| 3,969,762 | 7/1976 | Favreau | 358/38 |
| 4,035,730 | 7/1977 | Clayton | 325/348 |
| 4,101,837 | 7/1978 | Clayton, Jr. | 325/347 |
| 4,223,341 | 9/1980 | Drewery | 358/36 |
| 4,241,363 | 12/1980 | Maeyama | 358/36 |
| 4,293,818 | 10/1981 | Jarger | 329/50 |
| 4,345,286 | 8/1982 | Clarke | 358/31 |
| 4,348,689 | 9/1982 | Achiha | 358/31 |
| 4,355,333 | 10/1982 | Sato | 358/36 |
| 4,390,894 | 6/1983 | Raven | 358/36 |
| 4,451,792 | 5/1984 | Gay | 329/136 |
| 4,458,207 | 7/1984 | Favreau | 329/136 |

*Primary Examiner*—David E. Harvey
*Attorney, Agent, or Firm*—Kenneth M. Massaoni; Hubert J Barnhardt, III; Kelly A. Gardner

[57] ABSTRACT

In an FM television signal angle modulated with luminance and chrominance information, there exists a high degree of correlation between picture elements occurring one line period apart. In an effort to steer the pass band of a tunable bandpass filter to the instantaneous frequency of the incoming television signal, a steering signal is developed which utilizes this high degree of correlation. For NTSC systems, luminance information is delayed by one-line period (63.5 us in the U.S.A.) and combined with suitable delayed chrominance information to form the filter's steering signal. For MAC systems, one-line delayed luminance and two-line delayed chrominance information are alternately applied to the filter as its steering signal. By steering the pass band of the filter to the incoming signal, maximum signal will be captured with minimum noise, enhancing the signal-to-noise ratio of a color television system.

12 Claims, 3 Drawing Sheets

SIGNAL TO NOISE RATIO ENHANCEMENT USING BASEBAND SIGNALS IN AN FM TELEVISION SYSTEM

Matter enclosed in heavy brackets [ ] appears in the original patent but forms no part of this reissue specification; matter printed in italics indicates the additions made by reissue.

*This application is a continuation of application Ser. No. 07/957,076 filed Oct. 6, 1992, now abandoned, which is a continuation of application Ser. No. 07/541,787, filed Jun. 21, 1990, now abandoned which is a Reissue of Ser. No. 06/683,680 now U.S. Pat. No. 4,584,599.*

BACKGROUND OF THE INVENTION

1. Technical Field

The present invention relates to the field of improving the signal to noise ratio within a radio receiver receiving correlated signals, particularly, signals angle modulated with periodic information. In the preferred embodiment, the signal is a television signal which is frequency modulated with line and field scanned picture information.

2. Background Information

In the United States, color television broadcasts are made in accordance with National Television Systems Committee (NTSC) standards, which require that picture information be separated into two components, luminance (brightness) and chrominance (color). FIG. 1 is an amplitude-versus-frequency diagram illustrating, in simplified form, one horizontal line of a typical NTSC composite color television signal. This composite signal 110 comprises a luminance signal 112 and a chrominance signal 114. Both luminance signal 112 and chrominance signal 114 occupy a nominal bandwidth of 6 MHz, within which picture carrier 116 is located 1.25 MHz above the lower end of the band. Luminance information is modulated directly onto this picture carrier. A color subcarrier 118 is located 3.579545 MHz above picture carrier 116, and chrominance information is modulated onto subcarrier 118. (Audio information is amplitude modulated on another subcarrier 120 lying near the upper edge of the band.)

With solid state technology making inexpensive video storage available, alternatives to the frequency domain multiplexing of NTSC are now economically feasible. This is particularly timely as new broadcasting services involving direct-to-the-home transmission from high power satellites in the 12 GHz band are begining. Thus, it is both technologically and economically feasible to plan a new transmission format based upon time division multiplex of the analog components of the television signal instead of using a color-subcarrier-based system. The new format is generally referred to as Multiplexed Analog Components (MAC).

In MAC, luminance and chrominance components of each line of the video signal are time-compressed so as to transmit the components of a given line sequentially. This strategy avoids the need for a color subcarrier and maintains the components free of crosstalk and intermodulation. FIG. 2 is an amplitude-versus-time diagram illustrating one horizontal line of a typical MAC composite color television signal. A single video line of 63.5 us duration is shown. This duration is the length of a standard television line in the United States. The horizontal blanking interval (HBI) 222, in which no picture information is transmitted, is typically 10.9 us in length. The chrominance signal 224 and luminance signal 228, either of which may be time-compressed, follow the HBI. Between the chrominance signal 224 and the luminance signal 228 is a 0.28 us guard band 226, to assist in preventing interference between the two signals.

The MAC color television signal of FIG. 2 is obtained by generating conventional luminance and chrominance signals (as would be done to obtain a conventional NTSC or other composite color television signal) and then sampling and storing them separately. Luminance is sampled at a luminance sampling frequency and stored in a luminance store, while chrominance is sampled at a chrominance sampling frequency and stored in a chrominance store. The luminance or chrominance samples may then be time-compressed (by writing them into the store at their individual sampling frequency and reading them from the store at a higher frequency). A multiplexer selects either the luminance or chrominance store, at the appropriate time during the active video line, for reading thus creating the MAC signal of FIG. 2. If desired, audio samples may be transmitted during the horizontal blanking interval and are multiplexed (and optionally time-compressed) in the same manner as the video samples.

At the receiver, the MAC signal is separated into its components by a demultiplexer synchronized to the multiplexer in the transmitter. Usually, a microprocessor is used to generate the selection signal which chooses either a luminance memory or a chrominance memory for writing the incoming signal. The stored luminance and chrominance are then decompressed, if necessary, by reading them from the memories more slowly than they were written. The MAC multiplexing and demultiplexing processes are well known in the art.

Luminance and chrominance in general do not at every instant occupy the entire 6 MHz bandwidth alloted to television signals and actually have varying instantaneous frequencies within the band, and this is true whether they are transmitted in the NTSC or the MAC format. For this reason, it is possible to obtain additional noise reduction, below that available in a typical receiver equipped with a limiter, a fixed-frequency bandpass filter, and a discriminator by substituting a tunable bandpass filter for the fixed-frequency filter. The tuning signal for the filter is derived from the discriminator output and fed back to tune the filter to the center frequency of the input signal, to capture the maximum amount of information with the minimum amount of noise.

Many feedback systems have been developed for this purpose. A typical system is shown in Clayton, U.S. Pat. No. 4,101,837, assigned to the same assignee as the present application. Clayton describes a circuit having an amplitude limiter and a voltage-tuned bandpass filter in feedback relationship with the limiter. The filter is tuned to the center frequency of the IF input signal. The limiter operates as a conventional amplitude limiter in the presence of a strong input signal and as a bandpass filter having a narrow bandwidth in the presence of weak or marginal input signals. (Although Clayton shows the discriminator input to be taken from the limiter output, whereas FIGS. 3 and 4 of the present application show the discriminator input taken from the output of the tunable filter, the two limiter feedback loops —limiter and tunable filter—are equivalent.)

The problem which Clayton attempts to solve relates to the unavoidable delay associated with the reactances in the main feedback loop (from discriminator to voltage-tuned filter). At those frequencies at which this delay is equivalent to an even number of half cycles (e.g., 360°), the feedback is regenerative and tends to tune the filter to the instantaneous frequency. But at those frequencies at which the delay is an odd number of half cycles (e.g., 180°), the feedback tends to tune the filter away from the desired frequency. Clayton solves this problem by adjusting the delay to amount to 360+ at the chrominance subcarrier frequency, the frequency "most important to signal quality," col. 2, 11. 22–23, and by using a notch filter to eliminate from the main feedback loop those frequencies for which the delay amounts to about 180°.

One problem I have discovered with the prior art, however, is that the picture elements occurring 360° away from each other at 3.58 MHz are not necessarily highly correlated. A given picture element may bear little relation to the picture element occurring 360° earlier or later at the arbitrary frequency of 3.58 MHz. Because of this, the steering signal generated by the prior picture element for predicting the instantaneous frequency of the current picture element may also bear little relation to the actual instantaneous frequency corresponding to the current picture element. On the other hand, whether a physical picture is converted to an NTSC or a MAC format for transmission, a long as it is scanned in fields of adjacent parallel lines (line and field scanning) the amount of change from a picture element on one line to the corresponding picture element on the next line, or in the next field, or in the next frame, is very slight, due to the continuity of the physical picture itself. Therefore, television signals are highly correlated on a periodic basis, which could be a line, a field, or (in interlaced scanning) a frame. In the United States, a frame consists of 525 lines and is scanned in two interlaced fields of 262.5 lines each. In addition, because the notch filter of Clayton attenuates a good deal of luminance information, the entire incoming signal is not utilized, also causing less accurate steering than could be achieved if all luminance information were utilized.

SUMMARY OF THE INVENTION

It is an object of the present invention to improve the signal to noise ratio within a radio receiver.

It is another object of the present invention to operate a tunable filter so as to attenuate a maximum amount of noise and a minimum amount of the desired signal.

It is further an object of the present invention to determine the instantaneous frequency band occupied by an incoming signal and to tune the pass band of a tunable bandpass filter to the determined frequency band.

It is still further an object of the present invention to predict the instantaneous frequency band occupied by an incoming signal in which the instantaneous frequency of the signal is highly correlated with the instantaneous frequency of the incoming signal an integral number of periods earlier and later, and to tune the pass band of a tunable bandpass filter to the predicted frequency band.

It is also an object of the present invention to more accurately predict the instantaneous frequency of a television signal by using substantially all of the luminance information.

More particularly, it is an object of the present invention to accomplish the foregoing objects in a system in which the incoming signal is an NTSC television signal.

Further, it is an object of the present invention to accomplish the foregoing objects in a system in which the incoming signal is a MAC television signal.

The present invention makes use of the fact that there is a high degree of correlation between periodic signals, to predict the instantaneous frequency of a given signal based on the instantaneous frequency of a prior signal occurring a period earlier. Television signals angle modulated with line and field scanned luminance and chrominance information derived from a physical picture are highly correlated in periods of a line or a field.

The television receiver system includes a limiter, a tunable bandpass filter, and a discriminator. If, at the television receiver, the entire 6 MHz television band were received, much noise would be included in the signal. One way of reducing the amount of noise, thereby improving the signal-to-noise ratio, is to reduce the bandwidth of the filter so as to capture only the video signal and to center the pass band of the filter at the instantaneous frequency of the incoming signal.

In order to determine, by prediction, the instantaneous frequency band of an incoming signal and to tune pass band of the system's bandpass filter to this determined frequency band, a feedback system is employed which delays by one line period the luminance information contained in the video signal. In an NTSC system, where luminance and chrominance occur at the same time, chrominance information may be added without delay, or it may be delayed an additional line (a total of two lines) and added to the luminance information to form the tuning signal applied to the tuned bandpass filter. (The additional delay, if a substantially delayed chrominance signal is used, is necessary because successive lines of NTSC color are 180° out of phase from each other.) In a MAC system, where luminance and chrominance occur at different times, each is appropriately delayed and independently applied as the tuning signal to the voltage tuned bandpass filter. In addition, in order to more accurately predict the instantaneous frequency of the television signal, substantially all of the luminance information is used.

DESCRIPTION OF THE PREFERRED EMBODIMENT

Figure 1:
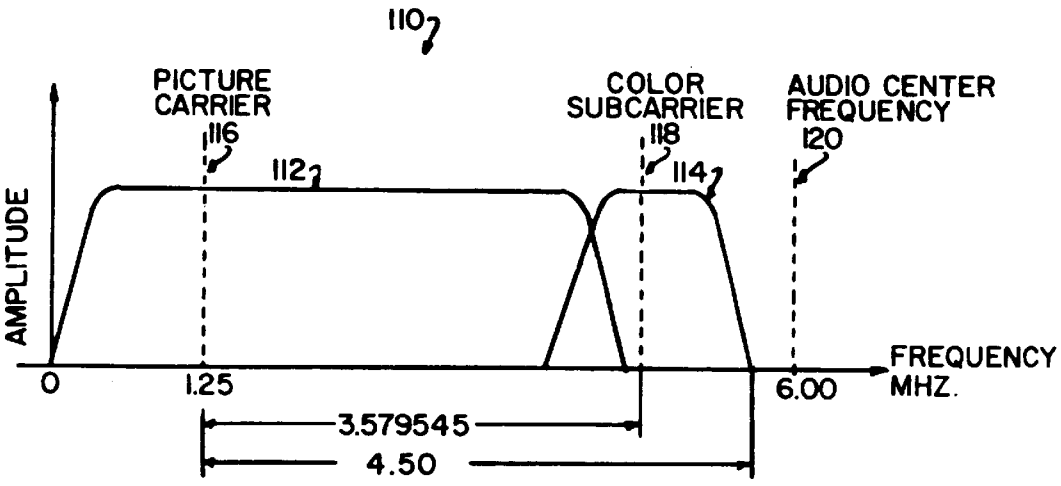
FIG. 1 is an amplitude-versus-frequency diagram illustrating, in simplified form, one horizontal line of a typical NTSC composite color television signal.
Figure 2:
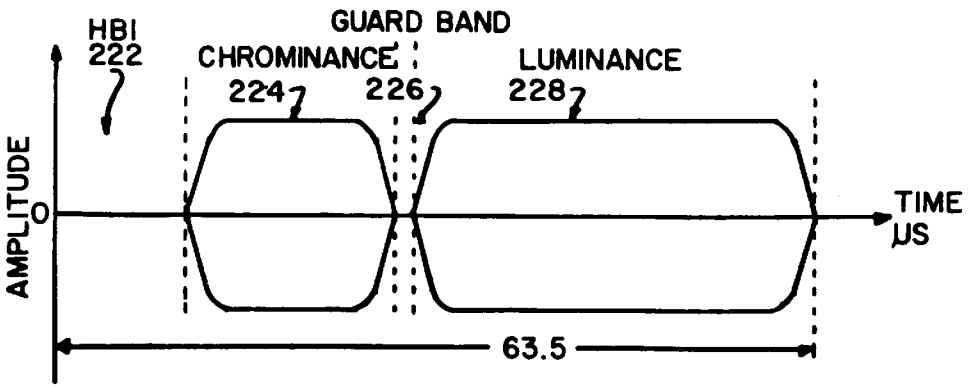
FIG. 2 is an amplitude-versus-time diagram illustrating one horizontal line of a typical MAC composite color television signal.
Figure 3:
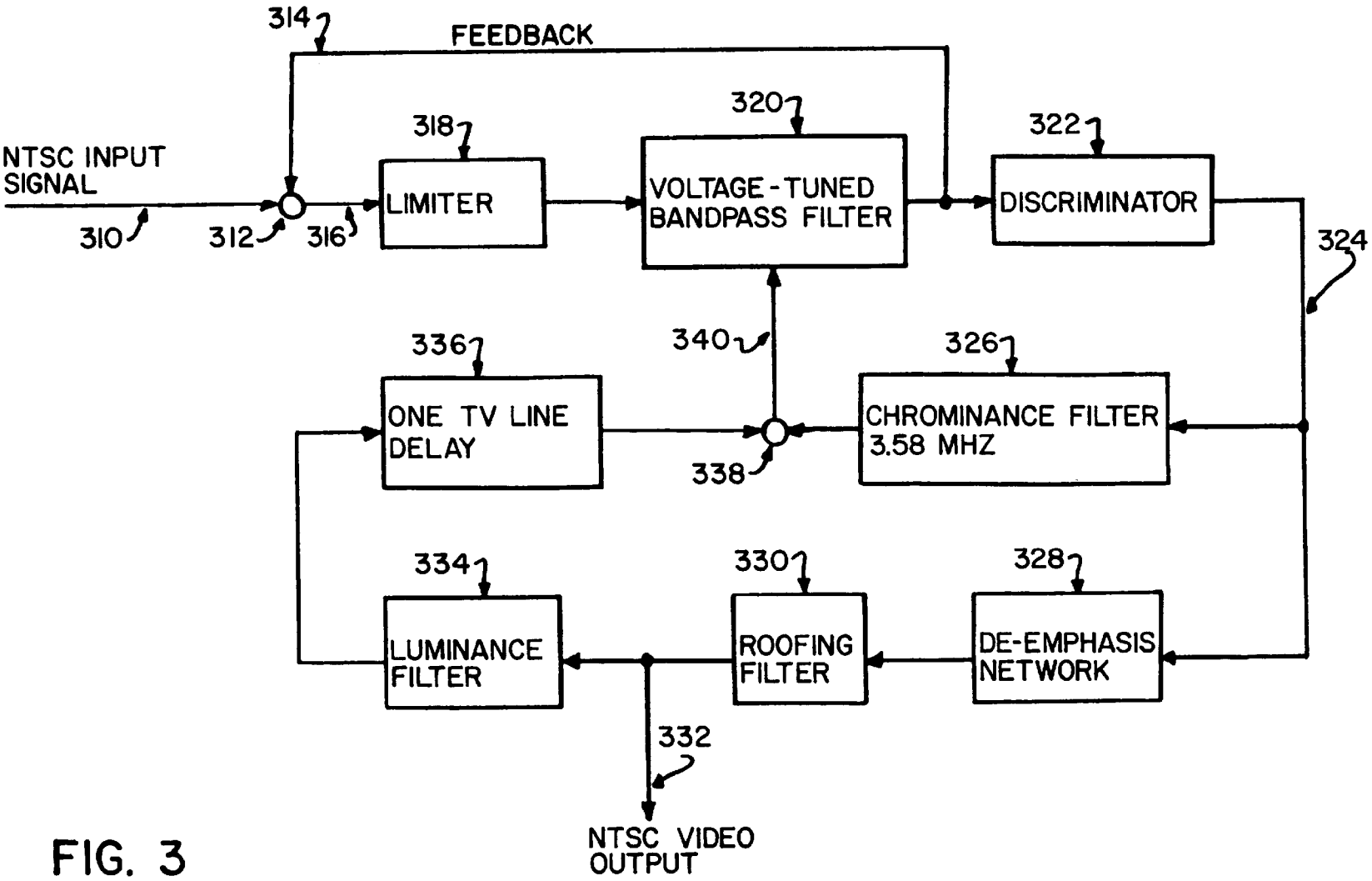
FIG. 3 is a block diagram of the preferred embodiment of the present invention, in a case in which the incoming signal is an NTSC television signal.

Turning now to FIG. 3, the preferred embodiment of the present invention, wherein the input signal is an NTSC composite television signal, is now discussed. The NTSC input signal 310 is input to a summing junction 312 where it is added to a feedback signal 314 from the limiter feedback loop. The combined signal 316 is input to the limiter 318, where all portions of the combined signal having an amplitude in excess of a predetermined amplitude will be limited to the predetermined amplitude. Additionally, the limiter prevents the passage of FM clicks (transient, spurious, large-deviation signal components). When an FM click occurs in the incoming signal 310, the bandwidth of the limiter is reduced such that only the feeback signal 314 is passed through the limiter to the voltage-tuned bandpass filter 320, after being limited in the manner as mentioned above. Such limiters are well known in the art, one such type is shown in Clayton Jr. et al., U.S. Pat. No. 4,101,837, incorporated herein by reference.

The voltage-tuned bandpass filter 320 passes a band of frequencies of the amplitude limited signal from the limiter 318. The band is tunable to the instantaneous frequency band of the input signal 310 occurring one line prior in time by the main feedback loop as now described.

The output of the filter 320 is an FM signal having constant amplitude. This constant amplitude, FM signal is input to a standard discriminator 322, which converts the frequency deviations at its input to voltage variations at its output.

The output signal 324 is input to a chrominance filter 326 which outputs only the chrominance portion of the video signal. A one-half cycle delay is part of the chrominance filter so that the chrominance information which is output from the chrominance filter is in phase with the incoming chrominance information on line 310.

Signal 324 is also de-emphasized by the de-emphasis network 328, and this de-emphasized signal is input to a roofing filter 330, the output of which is input to a luminance filter 334. The output signal of roofing filter 330 is the NTSC video signal 332 and is in a form suitable to be sent to a conventional color television receiver's baseband circuits for processing and display. The luminance filter 334 passes the luminance portion of signal 332, filtering out the color (chrominance) portion. The network 328 and filters 330 and 334 are conventional circuits whose operation and design are well known to those skilled in the art.

The output of filter 334 is delayed by one line period (63.5 us) by delay line 336. The delay line can be any conventional delay means capable of producing a 63.5 us delay, preferably a CCD register.

The one-line delayed luminance and the current chrominance (delayed by one-half cycle of its 3.58 MHz subcarrier to compensate for previous delays) are combined by summer 338 and form the voltage-tuned bandpass filter's tuning signal 340.

Due to the high degree of correlation between a given picture element and the corresponding picture element in the previous line, the previous field, or even the previous frame, delay line 336 could be adjusted to correspond to any of these periods or an integral multiple of them. The preferred embodiment, however, is directed to a delay period of one horizontal line (63.5 us).

Figure 4:
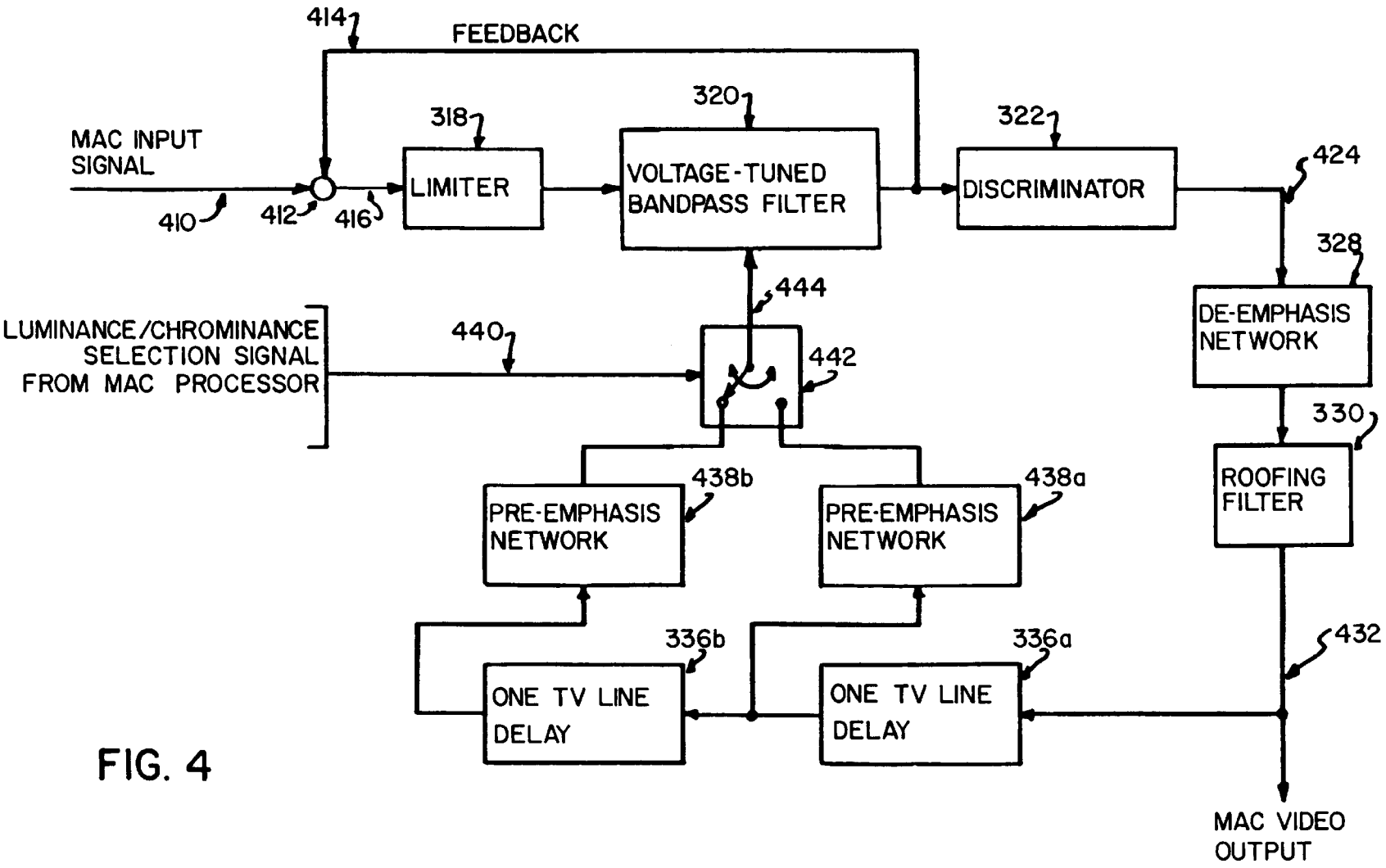
FIG. 4 is a block diagram of the preferred embodiment of the present invention, in a case in which the incoming signal is a MAC television signal.

Turning now to FIG. 4, the preferred embodiment of the present invention when the input signal is a MAC television signal is now discussed. The MAC input signal 410 is input to a summing junction 412 where it is added to feedback signal 414 from the limiter feedback loop. The combined signal 416 is input to the limiter 318, which limits the signal 416 to a predetermined amplitude. This limited signal is input to a voltage-tuned bandpass filter 320, the output of which is connected to the input of the discriminator 322. As the limiter 318, voltage-tuned bandpass filter 320, and discriminator 322 have been discussed in detail with reference to FIG. 3, as well as being conventional and well known to those skilled in the art, a detailed discussion here will be omitted.

The output 424 of discriminator 322 is input to a de-emphasis network 328, the output of which is input to roofing filter 330, outputting the MAC video output signal 432, suitable to be sent to a MAC color television's baseband circuits for processing and display. The de-emphasis network 328 and roofing filter 330 are identical to those discused with reference to FIG. 3.

Signal 432 is input to delay line 336a, where it is delayed by 63.5 us, and then to a second delay line 336b, also delaying it 63.5 us. Both delay lines 336a and 336b are identical to the delay line 336 discussed with reference to FIG. 3. The one-line delayed signal corresponds to luminance information, while the two-line delayed signal corresponds to chrominance information. Demultiplexer 442 determines to which instantaneous frequency, either chrominance or luminance, the filter 320 will be steered by steering signal 444. Demultiplexer 442 is controlled by the luminance/chrominance selection signal 440 from the MAC processor. However, before the delayed luminance or chrominance information can be used to steer the filter 320, each must be pre-emphasized by either pre-emphasis network 438a or 438b, respectively, in order to compensate for the de-emphasis network 328.

Due to the high degree of correlation between consecutive lines, fields, and frames of picture information, line delays 336a and 336b could be adjusted to correspond to these periods or any integral multiple of them.

What is claimed is:

1. An apparatus for improving the signal-to-noise ratio of a television signal angle modulated with line and field scanned luminance information, comprising:

limiter means receiving the television signal, for limiting the amplitude of the television signal to a predetermined value;

a voltage tuned bandpass filter, having a center frequency tunable by a tuning signal, to filter the limited signal from said limiter means;

discriminator means for demodulating the filtered signal;

feedback means for delivering the demodulated luminance information to said voltage tuned bandpass filter as the tuning signal, said feedback means comprising delay means for delaying the luminance information by one line.

2. An apparatus as claimed in claim 1, wherein the tuning signal includes substantially all of the demodulated luminance information.

3. An apparatus as claimed in claim 1, wherein the television signal is further angle modulated with line and field scanned chrominance information, and wherein said feedback means further comprises means for combining the one-line delayed luminance information with the chrominance information.

4. An apparatus for improving the signal-to-noise ratio of a television signal angle modulated with line and field scanned luminance and chrominance information, comprising:

limiter means receiving the television signal, for limiting the amplitude of the television signal to a predetermined value;

a voltage tuned bandpass filter, having a center frequency tunable by a tuning signal, to filter the limited signal from said limiter means;

discriminator means for demodulating the filtered signal;

feedback means, comprising:

a first delay means for delaying the luminance information by one-line, a second delay means for delaying the chrominance information by two-lines, and controllable switching means for selectively applying either the one-line delayed luminance information signal or the two-line delayed chrominance information signal to said voltage tuned bandpass filter as the tuning signal.

5. An apparatus as claimed in claim 4, further comprising:

means for generating a control signal to be applied to said controllable switching means.

[6. A method of tuning a tunable filter, to the instantaneous frequency band occupied by a previous incoming amplitude limited television signal angle modulated with line and field scanned luminance information, by a tuning signal, said method comprising:

filtering the limited signal by said tunable filter about a center frequency controllable by the tuning signal;

demodulating the filtered signal;

delaying the demodulated signal by a period substantially corresponding to one-line period, producing a tuning signal; and applying the tuning signal to said tunable filter so as to adjust said filter's center frequency based on incoming signal's instantaneous center frequency which occurred one-line period prior in time.]

7. A method of tuning a tunable filter, to the instantaneous frequency band occupied by a previous incoming amplitude limited television signal angle modulated with line and field scanned luminance and chrominance information, by a tuning signal, said method comprising:

filtering the limited signal by said tunable filter about a center frequency controllable by the tuning signal;

demodulating the filtered signal;

delaying the demodulated signal by a period substantially corresponding to one-line period, producing a one-line delayed signal;

delaying the one-line delayed signal by a period substantially corresponding to one-line period, producing a two-line delayed signal;

alternately applying the one-line delayed signal and the two-line delayed signal to said tunable filter so as to adjust said filter's center frequency based on the incoming signal's instantaneous center frequency which occurred alternately one-line period and two-line periods prior in time.

8. An apparatus for improving the signal-to-noise ratio of a television signal angle modulated with line and field scanned luminance information, comprising:

a voltage tuned bandpass filter, having a center frequency tunable by a tuning signal, to filter an amplitude limited signal;

discriminator means for demodulating the filtered signal;

feedback means for delivering the demodulated luminance information to said voltage tuned bandpass filter as the tuning signal, said feedback means comprising delay means for delaying the luminance information by one line.

9. An apparatus as claimed in claim 8, wherein the tuning signal includes substantially all of the demodulated luminance information.

10. An apparatus as claimed in claim 8, wherein the television signal is further angle modulated with line and field scanned chrominance information, and wherein said feedback means further comprises means for combining the one-line delayed luminance information with the chrominance information.

11. An apparatus for improving the signal-to-noise ratio of a television signal angle modulated with line and field scanned luminance and chrominane information, comprising:

a voltage tuned bandpass filter, having a center frequency tunable by a tuning signal, to filter an amplitude limited signal;

discriminator means for demodulating the filtered signal;

feedback means, comprising:

a first delay means for delaying the luminance information by one-line, a second delay means for delaying the chrominance information by two-lines, and controllable switching means for selectively applying either the one-line delayed luminance information signal or the two-line delayed chrominance information signal to said voltage tuned bandpass filter as the tuning signal.

12. An apparatus as claimed in claim 11, further comprising:

means for generating a control signal to be applied to said controllable switching means.

*13. A method of tuning a tunable filter, to the instantaneous frequency band occupied by a previous incoming amplitude limited television signal angle modulated with line and field scanned luminance information, by a tuning signal, said method comprising:*

*filtering the limited signal by said tunable filter about a center frequency controllable by the tuning signal;*

*demodulating the filtered signal;*

*delaying the luminance information of the demodulated signal by a period substantially corresponding to one-line period, producing a tuning signal; and*

*applying the tuning signal to said tunable filter so as to adjust said filter's center frequency based on incoming signal's instantaneous center frequency which occurred one-line period prior in time.*

* * * * *